J. A. & H. A. House.
Knitting Machine.
N° 53,224. Patented Mar. 13, 1866.
Fig. 1.
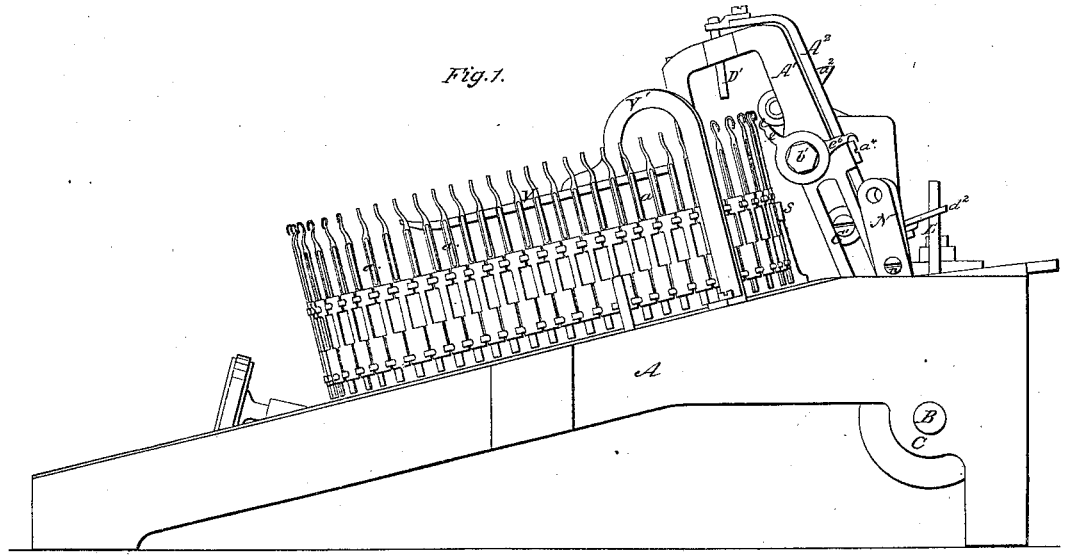
Fig. 2.
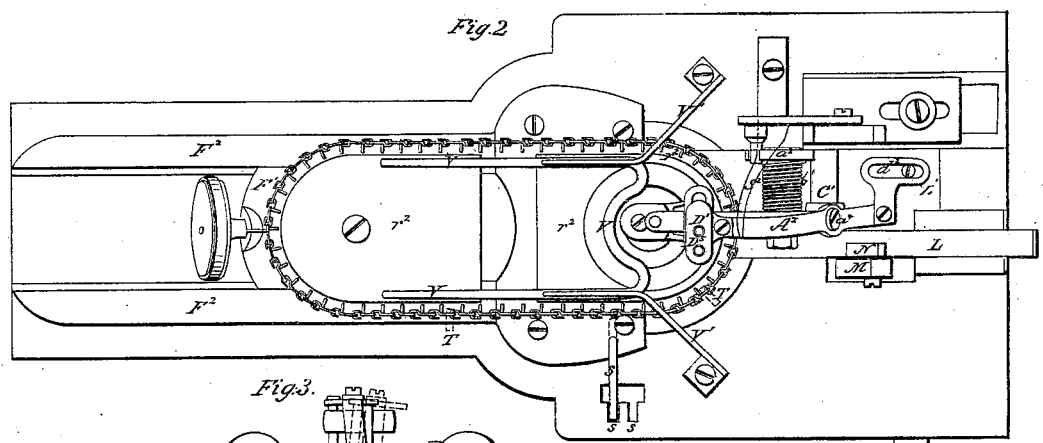
Fig. 3.
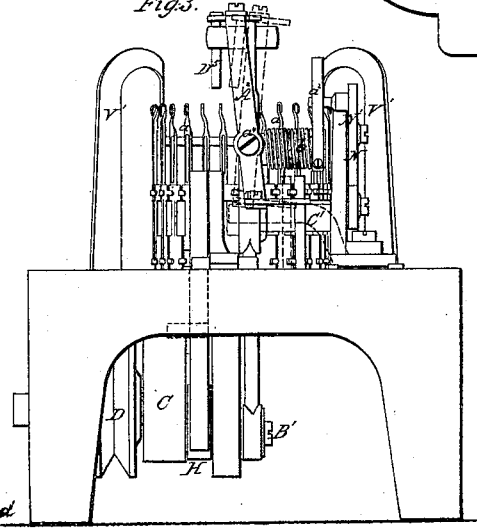
Fig. 2½.
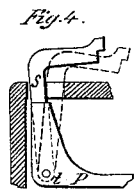
Fig. 4.
Witnesses
Rufus H. Sanford
Wilson H. Clark
Inventors.
Jas. A. House
Henry A. House
by
John E. Earle Sheet 2. 3 Sheets.
J. A. & H. A. House.
Knitting Machine.
N° 53,224. Patented Mar. 13, 1866.
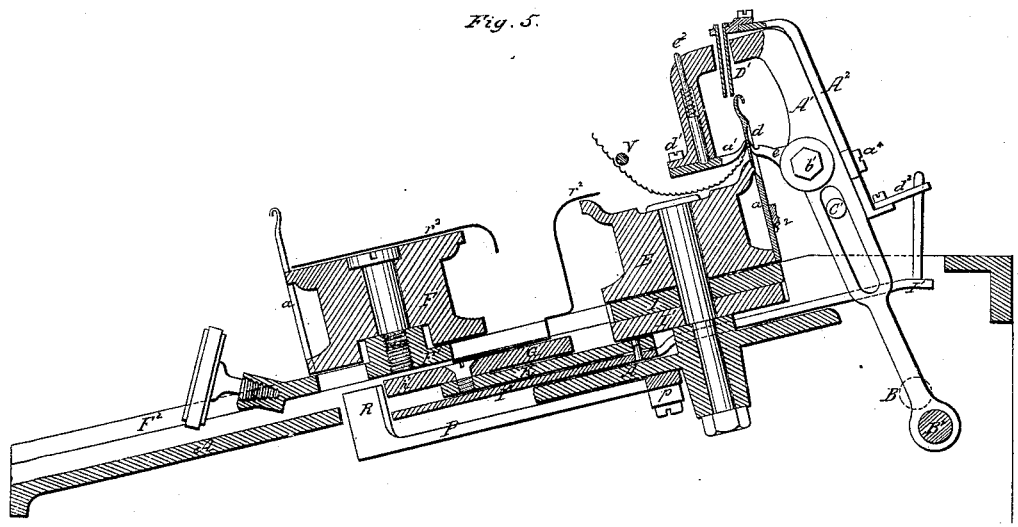
Fig. 5.
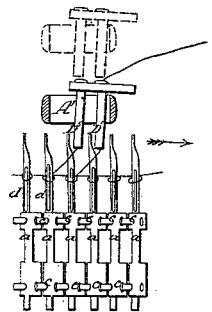
Fig. 6.
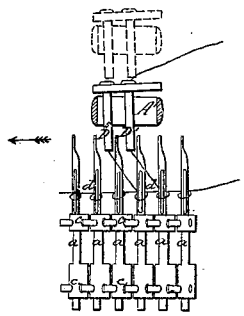
Fig. 7.
Fig. 5½.
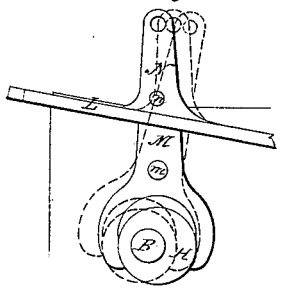
Fig. 9.
Fig. 8.
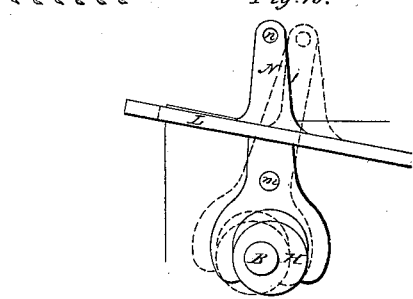
Fig. 10.
Witnesses
Rufus H. Sanford
Wilson H. Clark
Inventors.
Ja² A. House
Henry A. House
by John E. Earl.
N. PETERS, PHOTO-LITHOGRAPHER, WASHINGTON, D.C.

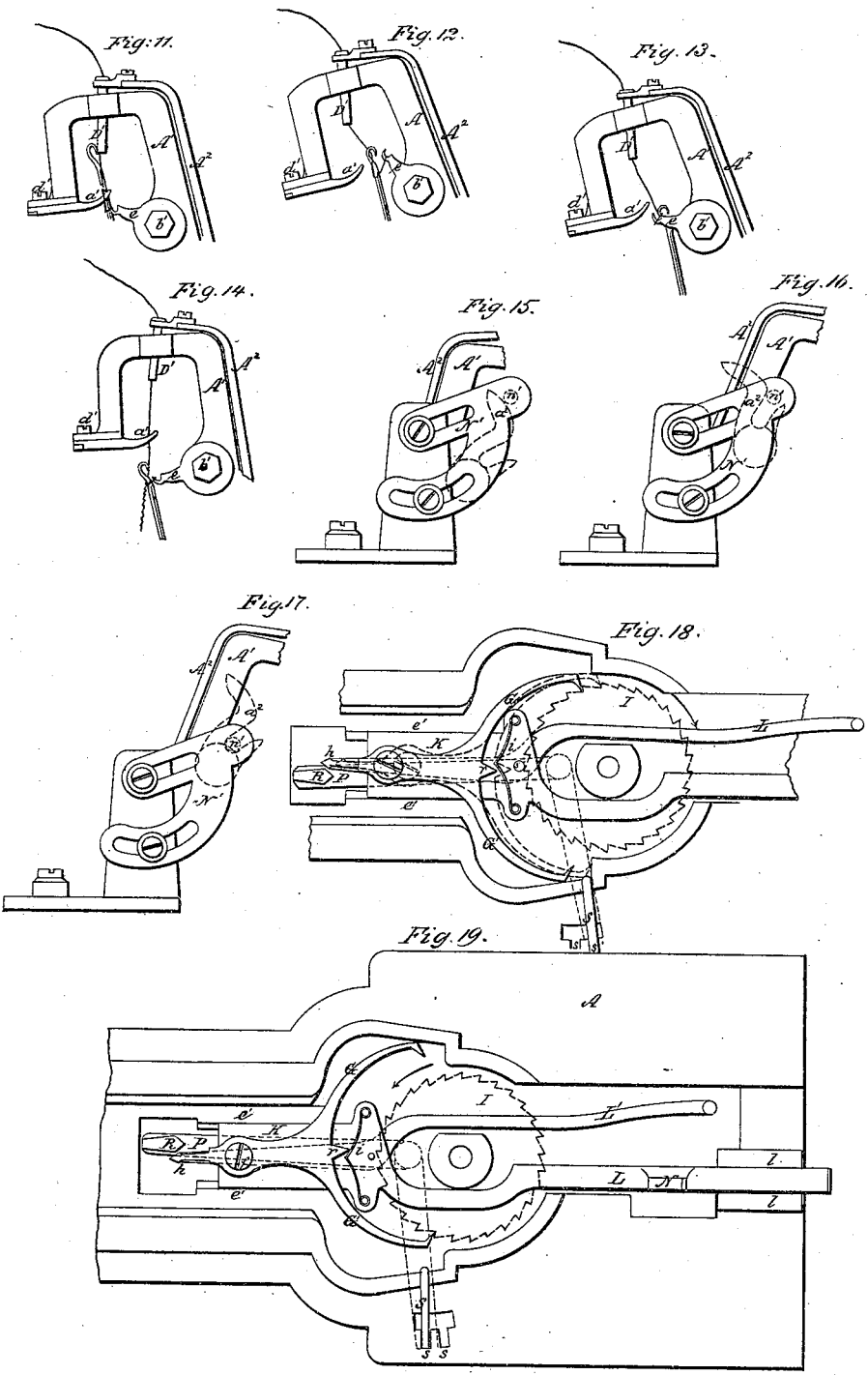

UNITED STATES PATENT OFFICE.

JAS. A. HOUSE AND HENRY A. HOUSE, OF BRIDGEPORT, CONNECTICUT, ASSIGNORS TO BRIDGEPORT KNITTING COMPANY, OF SAME PLACE.

IMPROVEMENT IN KNITTING-MACHINES.

Specification forming part of Letters Patent No. 53,224, dated March 13, 1866.

*To all whom it may concern:*

Be it known that we, J. A. HOUSE and H. A. HOUSE, of Bridgeport, in the county of Fairfield and State of Connecticut, have invented new and useful Improvements in Knitting-Machines; and we do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a top view; Fig. 3, an end view; Figs. 2½ and 4, detached parts of switching apparatus; Fig. 5, longitudinal central section; Figs. 5½ to 17, inclusive, detached views to illustrate the operation of the machine; and in Figs. 18 and 19, top views, the chain-wheels removed to illustrate the operation of the switching apparatus.

Same letters and characters indicate corresponding parts.

Our invention relates to improvements in machines for knitting, the object being to produce a family knitting-machine.

To enable those skilled in the art to construct our improved machine, we will proceed to fully describe the same as illustrated in the accompanying drawings.

A is the bed, upon which the operative parts of the machine are placed; B, the driving-shaft, resting so as to revolve in bearings C C, and which is driven by the application of power to the pulley D. (See Fig. 3.)

*a a* are needles, formed as more clearly shown in Figs. 5, 6, and 7. They are formed from steel, so as to be locked one to another at *c c* (see Fig. 6) by means of hooks upon one and corresponding eyes upon the next, as seen in Fig. 8. Above the upper point of connection the face of the needle is grooved, as at *d*, Figs. 5 and 6, the needle terminating in a hook formed so as to be one side of the center of the needle, as seen in Figs. 5 and 6, for the purpose hereinafter described. The several needles thus hooked together (their number being equal to the number of the stitches required for the article to be knitted) are arranged so as to form an endless chain, as seen in Fig. 2, and are placed upon two wheels, E F. (See Fig. 5.) The said wheels are toothed to receive and hold the needles when placed around them, as seen in Fig. 2, the chain of needles being moved intermittently by means of pawls G or G', (see Figs. 18 and 19,) actuated by a cam, H, on the driving-shaft, (see Fig. 3,) the one pawl, G, operating upon a ratchet-wheel, I, (see Fig. 18,) the other pawl, G', upon a similar wheel, I', (see Fig. 19,) both of the said ratchet-wheels being fixed to the needle-wheel E, the teeth of one being in the opposite direction to the teeth of the other. (See Figs. 18 and 19.) The pawls G and G' are constructed so that but one will act at the same time therefor. The direction in which the needles are moved depends upon which of the two pawls are acting upon their respective ratchet-wheels. The two pawls are joined together as in one piece and hung upon a pivot, *f*, on a plate, K, which moves freely in guides *e' e'*, and extends back, terminating in a bar, L, which also moves in guides *l*. The movement of the slide K to operate the pawls is seen in Fig. 19.

The cam H on the shaft B, which actuates the said pawls, we make of an eccentric form, and it revolves within the fork of a lever, M, which said lever is hung upon a pivot, *m*, and, extending up, is attached to a stud, N, on the bar L by a pivot, *n*, so that when the eccentric H revolves, as from the position in black to that denoted in red, it will carry with it the lever M and the bar L thereto attached, as from the position in black to that denoted in red, and continuing its movement will return, and with it the lever M and bar L, to its position in black. As thus shown, the chain of needles will be advanced a distance equal to the distance from center to center of the needles, making the relative position of the needles always the same. The direction in which the needles are moved depends upon which of the two pawls is acting, as before stated.

To change the pawls from one wheel to the other, so as to reverse the movement, we place a lever, P, (see Figs. 5, 18, and 19,) hung to the bed of the machine at *p* and extending up, terminating in a double inclined plane, R.

The body of the pawls extend back of the pivot, terminating in a tail-piece, *h*, which as the pawls return after having moved forward, as from the position in red to that in black, the tail-piece *h* will strike one of the inclines on the end R of the lever P, and thus the pawl G would be forced to act, turning the needles in the direction denoted by an arrow until the lever P should be moved to the position denoted in Fig. 19, when, returning as before, the tail-piece $h$ would strike the other incline of the end R and force the pawl G away from its wheel and the other pawl, G′, onto its wheel, to turn the needles in the opposite direction, as denoted by the arrow in Fig. 19.

A flat steel spring, $i$, attached to the slide K, bears upon a point, $r$, between the said pawls, so as to carry the pawls completely over from one position to the other and retain them in either position, in like manner as the same object is accomplished in numerous well-known machines.

The lever P is turned as denoted by broken lines in Figs. 18 and 19, and is operated by means of a latch, S, which extends up through the bed, as seen in Fig. 4.

In the bed two notches, $s$, are formed, into either of which the latch S may be placed, to hold the said lever in its proper position to direct the movement of the needles, as before described.

The latch S is pivoted to the lever P at $t$, so as to be readily moved out from one notch to turn the lever and lock into the next notch, as from the position in black to that in red. (Seen in said Fig. 4.) Our arrangement for making this change of direction automatic will be more fully described hereinafter.

$e$ is a hook fixed to a shaft, $b'$, which is hung to a bar, A′. The lower end of the said bar is attached to a crank, B′, on the driving-shaft B, and is guided by a pin, C′, so that the movement of the upper end of the bar A′ corresponds to the movement of the crank which drives it. In addition to the reciprocating movement given to the hook through the bar A′, the shaft to which it is attached is turned on its axis by means of a cam, $a^2$, as more fully described hereinafter.

The upper end of the bar A′ extends up and over the needles down upon their inside, supporting and operating beater-fingers or sinkers $a'$, the fingers being formed so as to pass freely between the needles, as seen in Fig. 5½, and being pivoted to the bar A′ at $d'$, so as to allow the fingers to vibrate. A spindle, $e^2$, its lower end conical, is placed within the bar A′, as seen in Fig. 5, so that a spring (denoted in red) will bear the said spindle down upon the sinker or beater plate, the conical end of the spindle resting in a seat formed for it in the said plate, so that a slight vibration may be allowed to the beaters, and the spindle $e^2$ serves to bring them back to the same central position.

Through the said bar a thread or yarn guide, D′, is placed. The yarn which is to be knitted is first passed down through the thread-guide D′ and looped around each of the needles, the loop being made from the inside out, as denoted in blue, Fig. 6, when the bar A′ ascends, carrying with it the hook $e$. The point of the hook $e$ enters the groove in the needle, as seen in Fig. 11, passing up, catches the loop denoted in red, carries the loop, as denoted in Fig. 12, while the thread-guide D′ carries the thread under the hook of the needle, as denoted in blue. Also seen in Fig. 6. The hook, still ascending, passes over the hook of the needle, carrying with it the loop, as denoted in Fig. 13, passing down leaves the said loop around the new yarn back of the needle, the new yarn forming a new loop around the needle, as seen in Fig. 14, in similar manner as new stitches are formed by hand. Descending again to the first position denoted in Fig. 11, the sinker $a'$ forces the loop thus formed down, as denoted in said Fig. 11. When this is done the needles are moved, as before described, so as to present a new needle with its loop for similar action by the hook $e$. The sinker-fingers, which are between the needles at the time of their movement, will be moved with the needles, but as soon as the beater is raised from the needles it will return to its central position, as before described. In its ascent the hook passes up in a line with the needle. To enable the hook $e$ to pass over the hooked end of the needle the hooks are formed upon one side of the center of the needles, as seen in Figs. 6 and 7. The hook $e$ is turned, as required in its movement to catch the loop, carry it over the end of the needle, and leave it, by means of the slotted cam $a^2$, attached to and moving with the said hook and formed as denoted in red, Figs. 15, 16, and 17, which views are taken upon the opposite side of the bar A′ to that denoted in the other figures. The said cam is guided by a pin, $n'$, on an adjustable stand, N′, so that as the needle-arm rises the slot in the said cam will pass over the pin $n'$, as denoted in Fig. 16, and the further movement upward of the said bar will turn the cam, as from the position in Fig. 16 to that denoted in Fig. 17, which movement turns the hook over the end of the needles, as before described. The operation of the said cam may be adjusted by means of the set-screws and slots seen on the stand which supports the pin $n'$, Figs. 15 and 16. By continuous operation the loops first formed around the needles are severally carried over the end of the needles, forming new loops with fresh yarn around each needle, to be in like manner taken by the hook, and in their turn carried over the end of their respective needles, and so continuing, the knitted work falling down, as denoted in red, Fig. 14. As the work cannot pass down through the machine because of the obstructions offered by the wheels E and F and by other parts, a wire guide, V, is placed within the needles, as seen in Figs. 1, 2, and 5, held in its position by supports V′, under which guide the work is taken out, as denoted in blue, Fig. 5.

The operation of our machine as thus far described has been the movement of the needles in but one direction, being that denoted by arrows in Figs. 6 and 19. If it is desired for any purpose to change the direction of the movement of the needles, move the latch S from the position in Fig. 19 to that in Fig. 18, as before described. This would change the direction of the needles only. It is also necessary that the yarn-guide D' shall be changed so as to lead the yarn to the opposite side of the needle, as from the position in Fig. 6 to to that in Fig. 7. For this purpose the thread-guide is fixed to a lever, $A^2$, hung to the bar A at $a^4$. By the movement of the said lever, as from the position in black to that denoted in red, Fig. 3, the thread-guide will be thus carried over. To make this change simultaneous with the change of the needle the lever L' (see Figs. 5, 18, and 19) is pivoted to the slide K at $s'$, so as to move with the said slide, the inner end of the lever terminating in like manner and directly below the tail end of the pawls, so that by the movement of the slide the said lever L' will be turned from the position in Fig. 18 to that in Fig. 19, in like manner as described for the movement of the pawls. The outer end of the lever L' is turned up, as seen in Fig. 5, the turned-up end passing through a slot, $d^2$, on the lower end of the lever $A^2$, as seen in Figs. 2 and 5, so that as the said lever L' moves from one position to the other, as described, it will turn the lever $A^2$ to carry the said lever $A^2$ from the position in black to that denoted in red, Fig. 3, and the thread-guide denoted in Fig. 6 to that in Fig. 7, or vice versa.

If desired to knit a narrow strip or but partially around, as for the heel of the stocking, the movement of the needles should be changed at the time when a sufficient number of stitches for the strip or heel have been knitted. To make this change automatic I place stops T (denoted in blue, Fig. 2, and shown detached in Fig. 2½) between the needles, the notch shown in the stop, Fig. 2½, setting onto the lever-connection between the needles, and at the same time move the latch S forward, as denoted in red, Figs 2 and 4, so that when either of the stops, by the movement of the needles, is brought in contact with the said latch it will move the latch, as from the position in Fig. 18 to Fig. 19, so as to turn the lever to reverse the movement of the needles, which reversed movement will continue until the other stop comes in contact with the latch, when it will return the latch and again reverse the movement of the needles, and thus will continue to knit that width until the latch is moved back into one of the notches $s$, so as to be out of the reach of the stops T, the said notches $s$ serving to securely hold the latch S, to prevent an accidental change of movement of the needles, or the stops removed or changed, the width of the strip depending upon the distance apart of the said stops. By placing the stops nearer together at each time the strip is knit across the strip may be narrowed down as desired.

The wheel F is placed upon a slide, F', which moves in guides $F^2$. The said slide is split at its rear end, as seen in Fig. 2, and a conical screw inserted therein, as seen in Fig. 5, so that by turning the said screw the slide may be secured in any desired position. If less stitches are wanted than the needles that are in the chain, we relieve the slide F' to allow the wheel F to move forward. This will slacken the chain so that one or more of the needles may be removed from the chain to reduce the number of stitches to be knitted. We then hook the two ends of the thus reduced chain together, draw the wheel F back to tighten the chain, and secure it, as before described; or, if more stitches are required than there are needles on the chain, open the chain and insert more needles.

If in knitting, as for a stocking, it is required to narrow, remove one or more of the needles at every point when it is desired to narrow, placing the loop which is on the needle removed onto the next needle, or to widen, insert more needles in the manner described, making new loops on the added needles in similar manner as for widening or narrowing when knitting by hand.

Thus far we have described our machine as using a single thread of yarn and making but a single stitch at each operation. The machine which we have represented is designed to carry two threads of yarn and knit two stitches at each operation. For this purpose we employ two yarn-guides, D' $D^5$, which carry each its own independent thread of yarn, as seen in Figs. 6 and 7. A second hook, $e^6$, also is required, which is placed upon the same shaft as the hook $e$, and the two operate together in the same manner as before described for the single hook. In Fig. 1 the second hook $e^6$ is represented as turned away, as it must be when but a single thread is used, and returned to a position corresponding to the hook $e$ when required for use.

It is necessary that each of the needles upon which the stitch is being formed should be rigidly held in its proper position before the hooks. For this purpose we introduce a pressure-spring, $S^2$, (denoted in blue, Figs. 1, 2, 3, and 5,) its upper end bearing against the needles at that point where the stitches are formed with sufficient force to hold them rigidly in the required position until the stitches are made, but so as to allow of the free movement of the needles from under its pressure and the introduction of the next.

More hooks than two may be used, but when so used each hook should be supplied with an independent thread of yarn, and for this purpose a special guide should be introduced for each hook, and the pressure upon each needle to hold it in its proper position should be in like manner as described for one or two. The two wheels E and F are covered by a thin metal plate, $r^2$ and $r^2$, (denoted by a heavy black line in Fig. 5,) for the purpose of protecting the work from entanglement in the machinery.

Having described our machine as for plain knitting only, it now remains for us to describe its operation for seaming or ribbing. When it is required to rib the work an odd number of needles must be used and double the movement given to the needles, so that the loops will be taken from alternate needles the first time round, and the second time round the loops will be taken from those needles which were skipped the first time round, and so on, each time round taking the loop from the needle which was skipped the last time round. To double the movement of the needles thus required it is only necessary to move the pivot $n$ so as to connect at the top of the stud N, as seen in Fig. 10, instead of at the position denoted in Fig. 9, which doubling the distance from the fulcrum $m$ of the lever M doubles the movement of the pawls G and G′, and consequently the movements of the needles.

Having therefore thus fully described our invention, what we claim as new and useful, and desire to secure by Letters Patent, is—

1. A chain of needles in a knitting-machine, when the same are constructed so as to be hooked together substantially in the manner and for the purpose specified.

2. Constructing the needles with their hooked ends upon one side of their center, substantially as and for the purpose set forth.

3. One or more hooks, $e$, in combination with the chain of needles, when the chain of needles is constructed and arranged to operate substantially in the manner and for the purpose herein set forth.

4. The combination of one or more hooks, $e$, with a vibrating sinker, $a'$, constructed and arranged to operate together substantially in the manner and for the purpose specified.

5. The adjustable stand N′, arranged in combination with and constructed so as to adjust the movement of the cam $a^2$.

6. The working-bar A′, constructed and arranged so as to operate the hook $e$, the thread-guide D′, and sinker $a$, substantially in the manner and for the purpose described.

7. One or more yarn-guides, D′, in combination with one or more hooks, $e$, and a chain of needles, when the said chain of needles is constructed in the manner described.

8. The combination of levers A² and L′ with the switching-lever P, substantially in the manner and for the purpose described.

9. The combination of the latch S and the switching-lever P, substantially as and for the purpose specified.

10. The combination of one or more stops, T, with the chain and needles, when arranged to operate the switching-lever P, substantially as and for the purpose set forth.

11. The pressure-spring S², in combination with a chain of needles, when the chain of needles is constructed and arranged to operate substantially as and for the purpose set forth.

12. The protecting-plates $r^2$ and $r^2$, covering the wheels E and E, in the manner and for the purpose described.

JAS. A. HOUSE.
HENRY A. HOUSE.

In presence of—
WILLIAM K. SEELEY,
SAMUEL LARKIN.